(12) United States Patent
Matsumura et al.

(10) Patent No.: US 12,184,358 B2
(45) Date of Patent: Dec. 31, 2024

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/908,806

(22) PCT Filed: Mar. 6, 2020

(86) PCT No.: PCT/JP2020/009853
§ 371 (c)(1),
(2) Date: Sep. 1, 2022

(87) PCT Pub. No.: WO2021/176725
PCT Pub. Date: Sep. 10, 2021

(65) Prior Publication Data
US 2023/0094549 A1 Mar. 30, 2023

(51) Int. Cl.
H04B 7/0404 (2017.01)
H04B 7/06 (2006.01)
H04B 7/08 (2006.01)

(52) U.S. Cl.
CPC ......... H04B 7/0404 (2013.01); H04B 7/0602 (2013.01); H04B 7/0805 (2013.01)

(58) Field of Classification Search
CPC .. H04B 7/0404; H04B 7/0602; H04B 7/0805; H04W 8/24; H04W 56/00; H04W 88/02
See application file for complete search history.

(56) References Cited

U.S. PATENT DOCUMENTS

| 2021/0050666 A1* | 2/2021 | Cirik | ..................... H04W 76/38 |
| 2021/0168714 A1* | 6/2021 | Guan | ................... H04B 7/0404 |

OTHER PUBLICATIONS

International Search Report issued in PCT/JP2020/009853 on Oct. 20, 2020 (2 pages).
Written Opinion of the International Searching Authority issued in PCT/JP2020/009853 on Oct. 20, 2020 (4 pages).
Huawei, HiSilicon; "Enhancements on multi-beam operation"; 3GPP TSG RAN WG1 Meeting #98, R1-1908067; Prague, Czech Republic; Aug. 26-30, 2019 (20 pages).
Nokia, Nokia Shanghai Bell; "On UE adaptation to the traffic"; 3GPP TSG RAN WG1 Meeting #95, R1-1813620; Spokane, USA; Nov. 12-16, 2018 (9 pages).

(Continued)

Primary Examiner — David B Lugo
(74) Attorney, Agent, or Firm — Osha Bergman Watanabe & Burton LLP

(57) ABSTRACT

According to an aspect of the present disclosure, there is provided a terminal including: a receiving section configured to receive information giving an instruction on activation or deactivation of a panel; and a control section configured to perform control to perform a communication operation using the panel or a communication operation not using the panel after a certain offset period with reference to at least one of a reception timing of the information and a transmission timing of a delivery confirmation signal for the information.

7 Claims, 10 Drawing Sheets

(56) References Cited

OTHER PUBLICATIONS

Intel Corporation; "On Beam Management Enhancement"; 3GPP TSG RAN WG1 Meeting #97, R1-1906816; Reno, USA; May 13-17, 2019 (17 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).
Office Action issued in Chinese Patent Application No. 202080098116.7, mailed on Apr. 26, 2024 (12 pages).

\* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In the universal mobile telecommunications system (UMTS) network, the specifications of long term evolution (LTE) have been drafted for the purpose of further increasing data rates, providing low delays, and the like (Non Patent Literature 1). In addition, the specifications of LTE-Advanced (third generation partnership project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 and subsequent releases) are also being studied.

In the existing LTE systems (for example, 3GPP Rel. 8 to 14), a user terminal (User Equipment (UE)) uses at least one of a UL data channel (for example, Physical Uplink Shared Channel (PUSCH)) or a UL control channel (for example, Physical Uplink Control Channel (PUCCH)) to transmit Uplink Control Information (UCI).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communication system (for example, NR), it is considered that a UE determines a DL reception beam (spatial domain reception filter) and a UL Tx beam (spatial domain transmission filter) on the basis of information notification of which is performed from a base station. In addition, it is considered that the UE performs DL reception and UL transmission by switching a plurality of UE panels (panel, antenna panel).

However, it is not clear how the UE controls the panel switching (for example, activate/deactivate). When the activation/deactivation of the panel cannot be appropriately controlled, system performance may be degraded, such as increased power consumption and decreased beam gain.

Therefore, an object of the present disclosure is to provide a terminal, a radio communication method, and a base station capable of appropriately controlling panel switching.

Solution to Problem

According to an aspect of the present disclosure, there is provided a terminal including: a receiving section configured to receive information giving an instruction on activation or deactivation of a panel; and a control section configured to perform control to perform a communication operation using the panel or a communication operation not using the panel after a certain offset period with reference to at least one of a reception timing of the information and a transmission timing of a delivery confirmation signal for the information.

Advantageous Effects of Invention

According to one aspect of the present disclosure, panel switching can be appropriately controlled.

DESCRIPTION OF EMBODIMENTS

Figure 1:
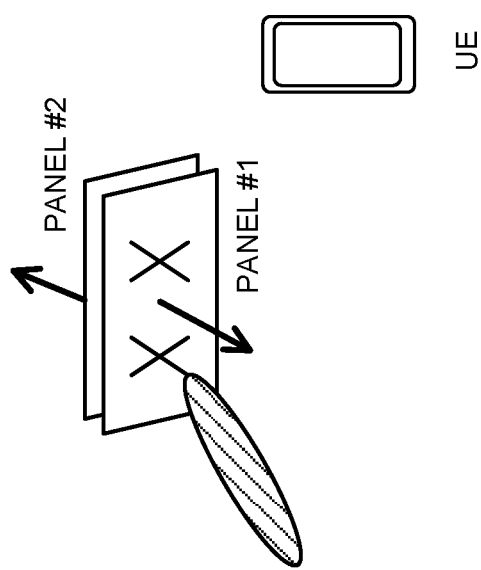
FIG. 1 is a diagram illustrating panel usage of a UE in 3GPP Rel. 15.

FIG. 1 is a diagram illustrating panel usage of a UE in 3GPP Rel. 15. In Rel. 15, selection/application of an uplink (UL) panel of user equipment (UE) is transparent to a network (NW, e.g., base station, gNB). The UE uses only one panel for UL transmission at a time and does not use a plurality of panels simultaneously. In the example illustrated in FIG. 1, the UE uses Panel #1 for UL transmission. In addition, the UE can dynamically switch and use the panel to be used by an implicit method (notification).

However, in Rel. 15, the UE always powers on the plurality of panels to support beam management. Since the UE always turns on the power of the panel, when a communication speed of the panel being used decreases due to an obstacle or the like, the UE can quickly switch to another panel, and performance is improved. However, there is a problem that the power consumption is large and inefficient by always turning on the power supply of the plurality of panels.

Therefore, it has been studied to determine whether to turn on or off the power of each panel of the plurality of panels and to switch the power of the panel on or off for control. For example, it is conceivable that the UE controls on (or activation) and off (or deactivation) of each panel on the basis of information notification of which is explicitly performed from the base station or information notification of which is implicitly performed.

For example, the UE may receive configuration information about the panel from the base station. The configuration information is information indicating on (activate)/off (deactivate) of power of the panel, and may be configured for each panel. The UE determines activation/deactivation of the panel based on the configuration information, and controls panel switching. Then, the UE transmits and receives a signal using the activated panel.

When the UE includes a plurality of panels, only some of the panels may be switchable. In addition, the UE may dynamically or semi-statically switch the activation/deactivation of the panel.

The UE may receive the configuration information of each panel by RRC signaling (for example, radio resource control (RRC) signaling). Notification of the activation/deactivation of each panel may be explicitly performed by RRC signaling.

Alternatively, the UE may receive the configuration information of each panel through a MAC control element (medium access control control element (MAC CE)). In addition, the UE may receive the configuration information of each panel by using both the RRC signaling and the MAC CE.

In the MAC CE, the activation/deactivation of the panel may be configured by an m-bit bitmap. m may be determined in advance in a specification or may be configured according to the number of panels set by RRC.

Alternatively, the UE may receive the configuration information of each panel by downlink control information (for example, DCI).

Alternatively, the activation/deactivation of the panel may be implicitly indicated by other parameters configured in the base station. For example, the on/off state of the panel j may be indicated by whether the panel ID (j) is configured for the RS (the panel is associated with the RS), whether the RS (aperiodic/semi-persistence/periodic) corresponding to the panel j is configured, or whether spatial relationship information corresponding to the panel j is configured.

As described above, it is possible to reduce the power consumption of the UE by controlling the activation/deactivation of the panel in the UE on the basis of the instruction from the base station.

Meanwhile, the UE that has received the information giving an instruction on the activation or deactivation of the panel (panel configuration information) performs the panel activation/deactivation operation (alternatively, ON/OFF operation). However, how the UE controls the activation/deactivation operation (for example, timing or the like) becomes a problem.

For example, there may be a case where a predetermined period is required from when the UE receives the configuration information of the panel to when the UE activates or deactivates the panel. In this case, in a case where communication is controlled on the assumption that transmission and reception are performed by switching the panel at the timing when the UE receives the configuration information on the base station side, communication quality may be deteriorated.

The present inventors have focused on the fact that inconsistency occurs in the timing of panel activation/deactivation between the base station and the UE when the activation/deactivation of the panel is performed on the basis of the panel configuration information, and have examined the timing of the activation/deactivation of the panel to conceive the present embodiment.

Hereinafter, embodiments according to the present disclosure will be described in detail with reference to the drawings. The radio communication methods according to the embodiments may be applied alone or in combination. Note that in the present disclosure, "A/B" and "at least one of A and B" may be interchangeable. Note that "notification" in the present disclosure may be replaced with "instruction", "configuration", or "transmission".

Hereinafter, the "panel" of the UE in the present disclosure may be mutually replaced with a "reference signal (RS) port group", a "demodulation reference signal (DMRS) port group", a "sounding reference signal (SRS) port group", an "RS resource group", a "DMRS resource group", an "SRS resource group", a "beam group", a "transmission configuration indication (TCI) state group", a "spatial relationship group", a "SRS resource indicator (SRI) group", or an "antenna port group".

The term "power on the panel" in the present disclosure means an active state of the panel, and may mean at least one of a state in which a downlink control channel (PDCCH) can be blindly detected in a set search space, a state in which a downlink shared channel (PDSCH) scheduled by downlink control information (DCI) or the like can be received from the NW, and a state in which a UL data channel (for example, physical uplink shared channel (PUSCH)) scheduled by the DCI or the like can be transmitted from the NW.

In addition, "power off the panel" in the present disclosure means an inactive state of the panel, and may mean at least one of a state in which blind detection of the PDCCH is not required in a configured search space, a state in which reception of the PDSCH scheduled by the DCI or the like from an NW is not required, and a state in which transmission of the PUSCH scheduled by the DCI or the like from an NW is not required.

In addition, the "activation" in the present disclosure may be read as activation, activation event, update, or renewal. The "deactivation" in the present disclosure may be read as deactivation, deactivation event, non-activation, or stop.

First Aspect

In a first aspect, a case where the UE controls the activation/deactivation of the panel on the basis of higher layer signaling (for example, MAC CE/RRC) will be described.

The network (for example, a base station) may explicitly instruct the UE to activate/deactivate the panel in higher layer signaling. The UE may determine the activation/deactivation of the panel based on the instruction of the higher layer signaling.

Alternatively, the base station may implicitly instruct the UE to activate/deactivate the panel through association between the panel and a channel/reference signal configured in higher layer signaling or the like. When a channel/reference signal is configured, the UE may determine the activation/deactivation of the panel associated with the configured channel/reference signal.

In a case where the instruction on the activation of the panel is given, the UE performs transmission processing/reception processing and the like using the panel to be activated (for example, the power of the panel is switched on). In a case where the instruction on the deactivation of the panel is given, the UE performs transmission processing/reception processing and the like without using the panel to be deactivated (for example, the power of the panel is switched off).

The UE for which the instruction on the activation/deactivation of the panel is given by higher layer signaling (for example, PDSCH) performs an operation corresponding to the activated/deactivated panel after a predetermined period elapses. The predetermined period may be a period starting from a transmission timing of HARQ-ACK (or PUCCH) for higher layer signaling (for example, PDSCH).

That is, the predetermined period may be configured with the transmission timing of HARQ-ACK (or PUCCH) as the starting position. The predetermined period, the offset period, the switching period, the update period, or the change period may be replaced with each other.

The HARQ-ACK may be an ACK. When the HARQ-ACK is a NACK, the UE may control not to perform an operation corresponding to the activated/deactivated panel. In the following description, a case where the ACK is transmitted as the HARQ-ACK will be described as an example.

In a case where the instruction on the activation of the panel is given, the UE may perform control to perform an operation (alternatively, communication operation) using the panel instructed to activate after the offset period elapses. In a case where the instruction on the deactivation of the panel is given, the UE may perform control such that the operation using the panel for which the instruction on the deactivation is given is not performed (or stop) after the offset period elapses.

The operation (alternatively, communication operation) using the panel refers to transmission processing/reception processing or the like using the panel, and may mean, for example, at least one of blind detection operation of PDCCH in a set search space, reception operation of PDSCH scheduled from NW by DCI or the like, transmission operation of PUSCH scheduled from NW by DCI or the like, and transmission operation of PUCCH.

The offset period may be determined based on at least one of the following Option 1-1 to Option 1-3.

<Option 1-1>

The offset period may be defined by a given value. The given value may be changed according to the subcarrier spacing set in the channel (for example, PUCCH) used for transmission of the HARQ-ACK.

Figure 2:
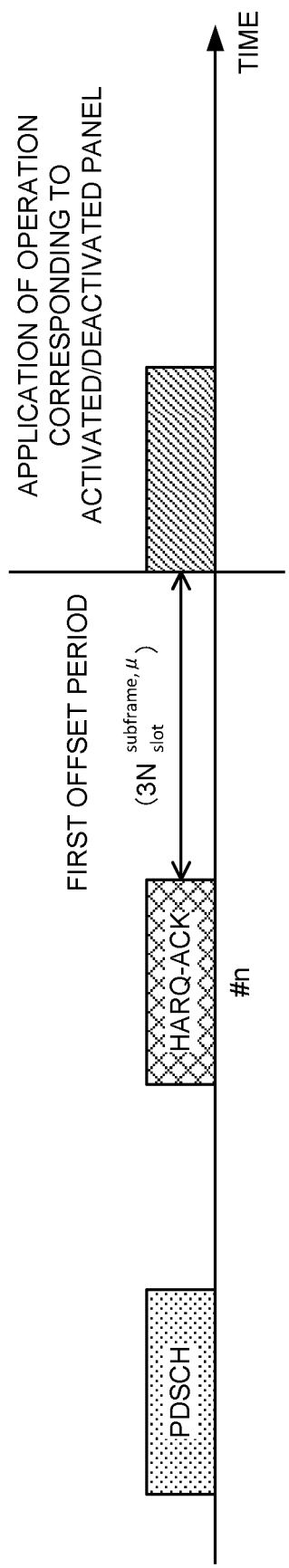
FIG. 2 is a diagram illustrating an example of activation/deactivation control of a panel according to the first aspect.

FIG. 2 is a diagram illustrating an example of UE operation when the UE receives a PDSCH including the activation/deactivation instruction (for example, the activation/deactivation command) of the panel. Here, the operation corresponding to the activated/deactivated panel is performed after the lapse of a given value corresponding to the offset period with the transmission timing of the HARQ-ACK to the PDSCH (for example, a transmission slot) as the starting position. In the following description, the slot may be replaced with a subframe, a subslot, or a symbol.

FIG. 2 illustrates a case where the given value is $3N_{slot}^{subframe,\mu}$. The $N_{slot}^{subframe,\mu}$ indicates the number of slots for each subframe, and may be a value set for each subcarrier spacing setting $\mu$. For example, the $N_{slot}^{subframe,\mu}$ may be 1 when the subcarrier spacing is 15 kHz ($\mu=0$), the $N_{slot}^{subframe,\mu}$, may be 2 when the subcarrier spacing is 30 kHz ($\mu=1$), the $N_{slot}^{subframe,\mu}$ may be 4 when the subcarrier spacing is 60 kHz ($\mu=2$), the $N_{slot}^{subframe,\mu}$ may be 8 when the subcarrier spacing is 120 kHz ($\mu=3$), and the $N_{slot}^{subframe,\mu}$ may be 16 when the subcarrier spacing is 240 kHz ($\mu=4$).

The given value is not limited to $3N_{slot}^{subframe,\mu}$, and another given value may be set.

FIG. 2 illustrates a case where the UE transmits a HARQ-ACK (or PUCCH) to the PDSCH including the activation/deactivation instruction of the panel in the slot #n. In this case, the UE may perform an operation corresponding to the activated/deactivated panel from the first slot after the slot $n+3N_{slot}^{subframe,\mu}$.

For example, in a case where the instruction on the activation of the panel is given, the UE may perform control to perform the communication operation (alternatively, panel switching) from the first slot after the slot $n+3N_{slot}^{subframe,\mu}$ by using the panel instructed to activate. In a case where the instruction on the deactivation of the panel is given, the UE may perform control to perform the communication operation from the first slot after the slot $n+3N_{slot}^{subframe,\mu}$ without using the panel instructed to deactivate.

In this manner, by starting the operation corresponding to the activation/deactivation of the panel after the predetermined offset period, the base station side and the UE side can appropriately recognize the panel switching timing.

<Option 1-2>

The offset period may be defined based on a given value and another given value. The given value may be changed according to the subcarrier spacing set in the channel (for example, PUCCH) used for transmission of the HARQ-ACK.

The other given value (for example, X) may be a value defined in a predetermined unit based on the numerology (for example, the subcarrier spacing) of the PUCCH. The predetermined unit may be at least one of a subframe, a slot, a subslot, and a symbol. Alternatively, anther given value (X) may be an absolute value.

In addition, another given value (X) may be defined in advance in the specification. Alternatively, another given value (X) may be determined according to the UE capability. In this case, UE capability information (for example, X corresponding to the UE capability) may be reported from the UE to the base station.

Alternatively, notification of another given value (X) may be performed from the base station to the UE by using at least one of the higher layer signaling and the DCI. For example, the base station may notify the UE of X based on UE capability information reported from the UE.

Figure 3:
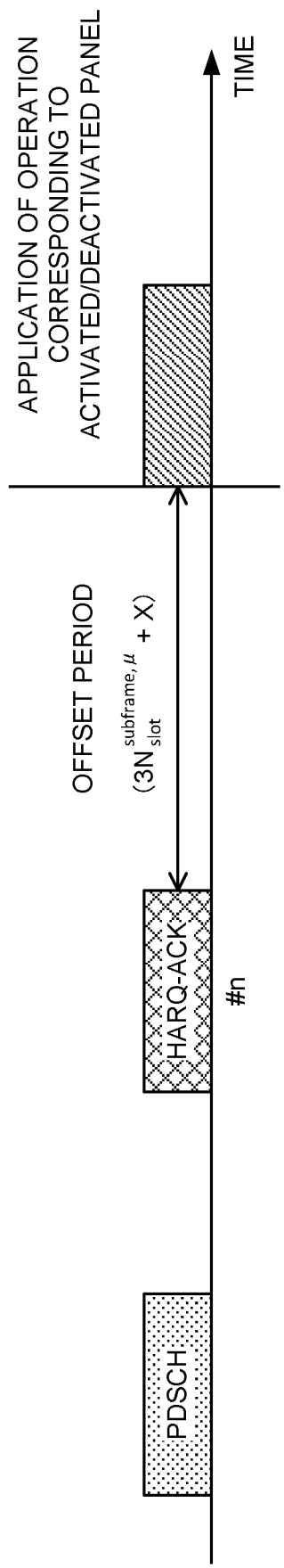
FIG. 3 is a diagram illustrating another example of the activation/deactivation control of the panel according to the first aspect.

FIG. 3 is a diagram illustrating an example of UE operation when the UE receives a PDSCH including the activation/deactivation instruction (for example, the activation/deactivation command) of the panel. Here, the operation corresponding to the activated/deactivated panel is performed after the given value corresponding to the offset period+another given value (X) elapses with the transmission timing of the HARQ-ACK to the PDSCH (for example, a transmission slot) as the starting position.

FIG. 3 illustrates a case where the given value is $3N_{slot}^{subframe,\mu}$, and another given value is X. The given value is not limited to $3N_{slot}^{subframe,\mu}$, and another given value may be set.

FIG. 3 illustrates a case where the UE transmits HARQ-ACK (or PUCCH) to the PDSCH including the activation/deactivation instruction of the panel in the slot #n. In this case, the UE may perform an operation corresponding to the panel activated/deactivated from the first slot after the slot $n+3N_{slot}^{subframe,\mu}+X$.

For example, in a case where the instruction on the activation of the panel is given, the UE may perform control to perform the communication operation (alternatively, panel switching) from the first slot after the slot $n+3N_{slot}^{subframe,\mu}+X$ using the panel instructed to activate. When the instruction on the deactivation of the panel is given, the UE may perform control such that the communication operation is performed from the first slot after the slot $n+3N_{slot}^{subframe,\mu}+X$ without using the panel for which an instruction to deactivate is given.

In this manner, by starting the operation corresponding to the activation/deactivation of the panel after the predetermined offset period, the base station side and the UE side can appropriately recognize the panel switching timing. Furthermore, the offset period can be flexibly configured by considering another given value (X) as the offset period.

<Option 1-3>

The offset period (or length) may be changed on the basis of a predetermined condition. For example, in a case where the offset period is defined by a given value and another given value (X), the offset period (for example, at least one of a given value and another given value (X)) may be changed on the basis of a predetermined condition. The change of the offset period may be controlled by the value of another given value (X) or the presence or absence of configuration of X.

The predetermined condition may be content an instruction on which is given by higher layer signaling (or PDSCH). For example, an offset period in a case where the instruction on the activation of the panel is given and an offset period in a case where the instruction on the deactivation of the panel is given may be separately configured (for example, differently).

The offset period in a case where the instruction on the deactivation of the panel (switching from activation to deactivation) is given may be set shorter than the offset period in a case where the instruction on the activation of the panel (switching from deactivation to activation) is given. That is, the offset period for newly activating the panel may be set longer than the offset period for deactivating the panel.

For example, in a case where a period required to turn on the power of the panel and make the panel applicable is different from a period required to turn off the power of the panel, communication can be flexibly controlled by flexibly configuring the offset period.

Figure 4A:
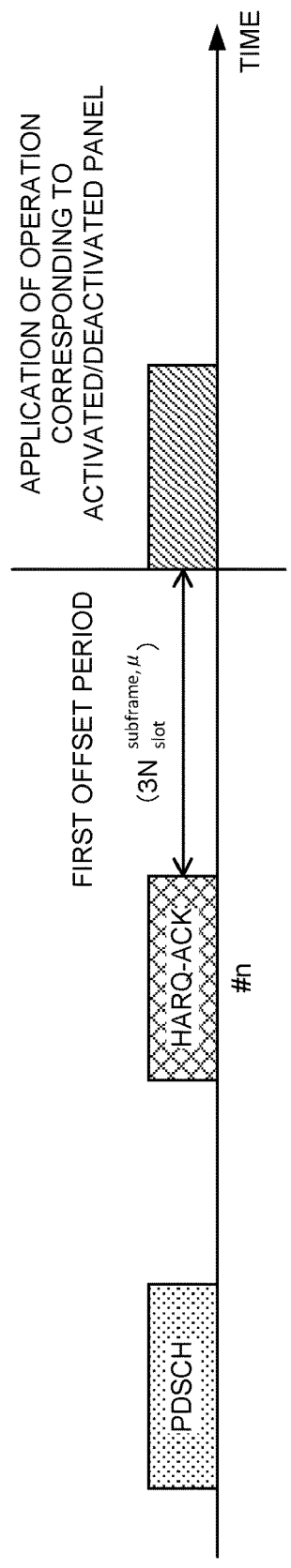
FIGS. 4A and 4B are diagrams illustrating another example of the activation/deactivation control of the panel according to the first aspect.
Figure 4B:
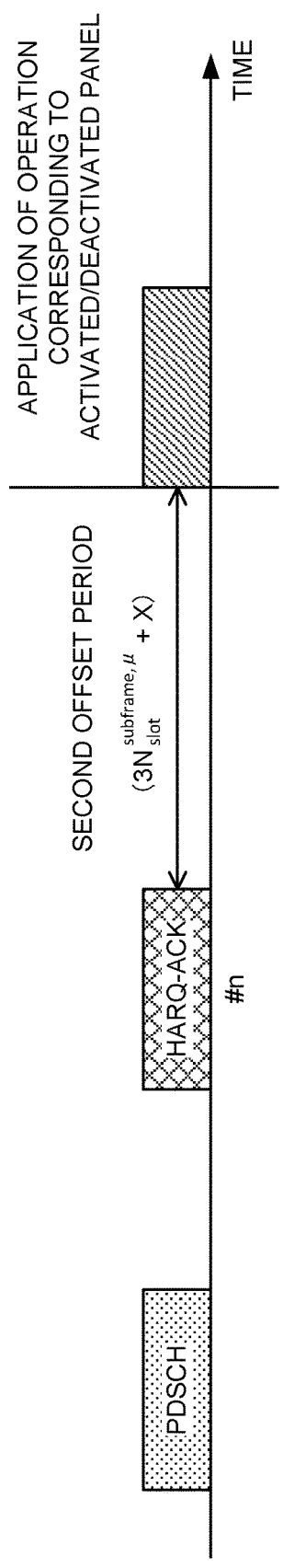

FIGS. 4A and 4B are diagrams illustrating an example of a case where the offset period is changed and applied on the basis of a predetermined condition. Here, a case where the offset period is changed (alternatively, different offset periods are set) on the basis of whether or not X is applied (or addition) is illustrated.

For example, when the instruction on the deactivation of the panel is given, the UE may apply a first offset period (see FIG. 4A). Here, a case where the first offset period is $3N_{slot}^{subframe,\mu}$ (for example, X=0) is illustrated. In this case, the UE may perform control to perform the communication operation without using the panel for which the instruction to deactivate is given from the first slot after the slot $n+3N_{slot}^{subframe,\mu}$.

For example, when the instruction on the activation of the panel is given, the UE may apply a second offset period (see FIG. 4B). Here, a case where the second offset period is $3N_{slot}^{subframe,\mu}+X$ is illustrated. In this case, the UE may perform control to perform the communication operation using the panel for which the instruction to activate is given from the first slot after the slot $n+3N_{slot}^{subframe,\mu}+X$.

When the instruction on the activation is given, the UE applies the second offset period ($n+3N_{slot}^{subframe,\mu}+X$) longer than the first offset period ($n+3N_{slot}^{subframe,\mu}$) when deactivation is instructed.

Here, the case where the offset period is changed on the basis of whether or not another given value (X) is applied has been described, but the present invention is not limited thereto. Both the first offset period and the second offset period may include X, and the value of X may be set differently. The value of X may be defined in the specification, or may be provided in notification from the base station to the UE by using at least one of higher layer signaling and DCI.

The predetermined condition is not limited to the content an instruction on which is given by the higher layer signaling (or PDSCH). For example, the predetermined condition may be a spatial relationship corresponding to a panel to be activated or the presence or absence of activation of a transmission configuration indication state.

The spatial relationship may be spatial relationship information. The spatial relationship may be a spatial relationship of the PUCCH. The transmission configuration indication or the transmission configuration indicator (TCI) state (TCI state (TCI-state)) may be a TCI state of the PDSCH or PUCCH.

For example, the UE may apply the first offset period when the instruction on the activation of the panel is given and the spatial relation/TCI state corresponding to the panel is activated. Meanwhile, when the instruction on the activation of the panel is given and the spatial relationship/TCI state corresponding to the panel is not activated, the second offset period longer than the first offset period may be applied.

In a case where there are a plurality of spatial relationships/TCI states corresponding to the panel, the UE may apply the first offset period when all spatial relationships/TCI states are activated and apply the second offset when at least one spatial relationship/TCI state is deactivated. Alternatively, the UE may apply the first offset period when at least one spatial relation/TCI state is activated.

Second Aspect

In a second aspect, a case where the UE controls the activation/deactivation of the panel on the basis of downlink control information (for example, DCI) will be described.

The network (for example, a base station) may explicitly instruct the UE in the DCI to activate/deactivate the panel. The UE may determine the activation/deactivation of the panel based on the instruction of the DCI.

Alternatively, the UE may be instructed to activate/deactivate the panel via whether or not a predetermined channel (for example, PDCCH/PDSCH/PUCCH/PUSCH) is scheduled on the panel. When a predetermined channel is scheduled or assigned to a certain panel, the UE may determine that the panel is activated.

In a case where the instruction on the activation of the panel is given, the UE performs transmission processing/reception processing and the like using the panel to be activated (for example, the power of the panel is switched on). In a case where the instruction on the deactivation of the panel is given, the UE performs transmission processing/reception processing and the like without using the panel to be deactivated (for example, the power of the panel is switched off).

The UE for which an instruction on activation/deactivation of the panel is given by the DCI performs an operation corresponding to the activated/deactivated panel after a predetermined period elapses.

The predetermined period may be a period starting from the reception timing of the DCI (Option 2-1). That is, the predetermined period may be set with the DCI reception timing as the starting position. The starting position may be determined on the basis of at least one unit of a subframe, a slot, a subslot, and a symbol. The predetermined period, the offset period, the switching period, the update period, or the change period may be replaced with each other.

Alternatively, the predetermined period may be a period starting from a transmission timing of a HARQ-ACK (or PUCCH) for a PDSCH scheduled by the DCI (Option 2-2). That is, the predetermined period may be configured with the transmission timing of HARQ-ACK (or PUCCH) as the starting position. The starting position may be determined on the basis of at least one unit of a subframe, a slot, a subslot, and a symbol.

<Option 2-1>

When the instruction on the activation of the panel is given by the DCI, the UE performs control to perform the communication operation using the panel for which the instruction to activate is given after the offset period from the reception timing of the DCI (or PDCCH). In addition, in a case where the instruction on the deactivation of the panel is given by the DCI, the UE performs control such that the communication operation using the panel for which the instruction on the deactivation is given is not performed (or stop) after the offset period from the reception timing of the DCI (or PDCCH).

The offset period may be defined by a given value (for example, X). The given value (X) may be a value defined in a predetermined unit based on the numerology (for example, the subcarrier spacing) of the DCI (or PDCCH). The predetermined unit may be at least one of a subframe, a slot, a subslot, and a symbol. Alternatively, the given value (X) may be an absolute value.

The given value (X) may be defined in advance in the specification. Alternatively, the given value (X) may be determined according to UE capability (for example, the UE capability). In this case, UE capability information (for example, X corresponding to the UE capability) may be reported from the UE to the base station.

Alternatively, notification of the given value (X) may be performed from the base station to the UE by using at least one of higher layer signaling and DCI. For example, the base station may notify the UE of X based on UE capability information reported from the UE.

Figure 5:
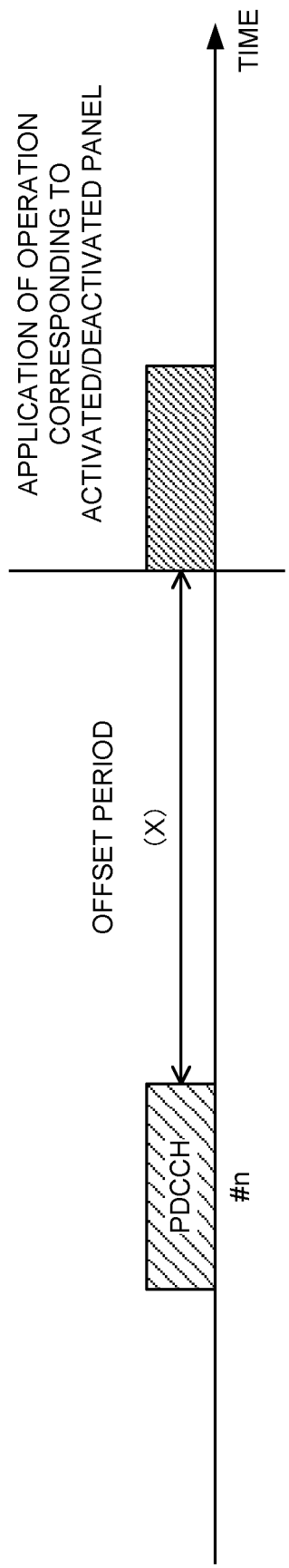
FIG. 5 is a diagram illustrating an example of activation/deactivation control of a panel according to a second aspect.

FIG. 5 is a diagram illustrating an example of UE operation when the UE receives the PDCCH (or DCI) including the activation/deactivation instruction (for example, the activation/deactivation command) of the panel. Here, the operation corresponding to the activated/deactivated panel is performed after the given value (X) corresponding to the offset period has elapsed with the reception timing of the PDCCH (for example, the reception slot) as the starting position. The slot may be replaced with a subframe, a subslot, or a symbol.

FIG. 5 illustrates a case where the UE receives the PDCCH including the activation/deactivation instruction of the panel in the slot #n. In this case, the UE may perform an operation corresponding to the panel activated/deactivated from the first slot after slot n+X.

For example, in a case where the instruction on the activation of the panel is given, the UE may perform control to perform the communication operation (alternatively, panel switching) from the first slot after the slot n+X using the panel for which the instruction to activate is given. In a case where the instruction on the deactivation of the panel is given, the UE may perform control to perform the communication operation from the first slot after the slot n+X without using the panel fir which the instruction to deactivate is given.

The UE may assume or determine that it is not required to perform the activation/deactivation of the panel prior to the slot n+X. For example, in a case where a transmission opportunity of the PUCCH is configured after the slot n+X, the UE may perform control not to perform PUCCH transmission using a panel for which the instruction on the deactivation is given.

In addition, in a case where the transmission opportunity of the PUCCH is configured after the slot n and before the slot n+X, the UE may perform control so as not to perform the PUCCH transmission using a panel for which the instruction on the deactivation is given.

In this manner, by starting the operation corresponding to the activation/deactivation of the panel after the predetermined offset period, the base station side and the UE side can appropriately recognize the panel switching timing.

<Option 2-2>

When the instruction on the activation of the panel is given by the DCI, the UE performs control to perform the communication operation using the panel for which the instruction to activate is given after the offset period from the transmission timing of the HARQ-ACK to the PDSCH scheduled by the DCI (or PDCCH). Furthermore, in a case where the instruction on the deactivation of the panel is given by the DCI, the UE performs control such that the communication operation using the panel for which the instruction to deactivate is given is not performed (or stop) after the offset period from the transmission timing of the HARQ-ACK to the PDSCH scheduled by the DCI (or PDCCH).

The offset period may be set similarly to Option 2-1.

Figure 6:
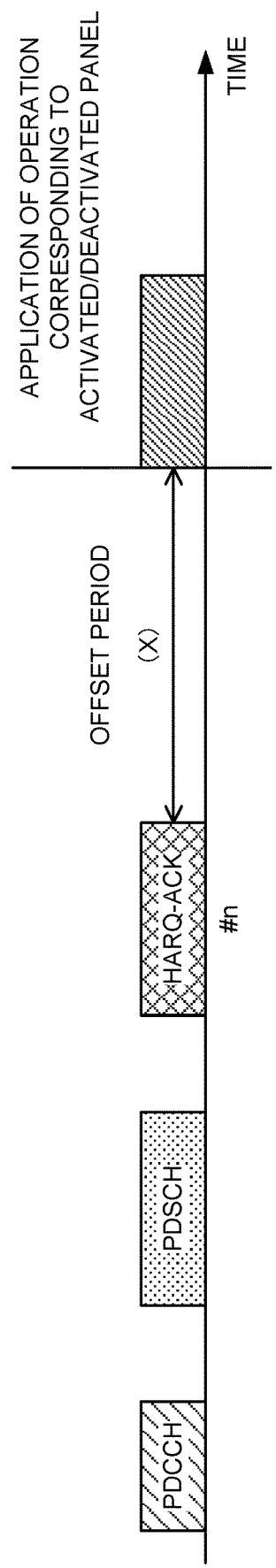
FIG. 6 is a diagram illustrating another example of the activation/deactivation control of the panel according to the second aspect.

FIG. 6 is a diagram illustrating an example of the UE operation when the UE receives the PDCCH (or DCI) including the activation/deactivation instruction (for example, the activation/deactivation command) of the panel. Here, the operation corresponding to the activated/deactivated panel is performed after the lapse of a given value (X) corresponding to the offset period with the transmission timing (for example, transmission slot) of the HARQ-ACK of the PDSCH scheduled on the PDCCH as the starting position. The slot may be replaced with a subframe, a subslot, or a symbol.

FIG. 6 illustrates a case where the UE transmits, in the slot #n, the HARQ-ACK of the PDSCH scheduled by the PDCCH (or DCI) including the activation/deactivation instruction of the panel. In this case, the UE may perform an operation corresponding to the panel activated/deactivated from the first slot after slot n+X.

For example, in a case where the instruction on the activation of the panel is given, the UE may perform control to perform the communication operation (alternatively, panel switching) from the first slot after the slot n+X using the panel for which the instruction to activate is given. In a case where the instruction on the deactivation of the panel is given, the UE may perform control to perform the communication operation from the first slot after the slot n+X without using the panel fir which the instruction to deactivate is given.

The UE may assume or determine that it is not required to perform the activation/deactivation of the panel prior to the slot n+X. For example, in a case where a transmission opportunity of the PUCCH is configured after the slot n+X, the UE may perform control not to perform PUCCH transmission using a panel for which the instruction on the deactivation is given.

In addition, in a case where the transmission opportunity of the PUCCH is configured after the slot n and before the slot n+X, the UE may perform control so as not to perform the PUCCH transmission using a panel for which the instruction on the deactivation is given.

As described above, by setting the starting position of the offset as the transmission timing of the HARQ-ACK (for example, ACK) for the PDSCH scheduled by the PDCCH, even when the UE misdetects the DCI, the base station side and the UE side can appropriately recognize the panel switching timing.

<Variation>

In the option 2-1 or 2-2, the offset period (for example, a given value (X)) may be set such that the period (or length) is changed on the basis of a predetermined condition. For the condition of changing the offset period and the like, Option 1-3 in the first aspect may be applied.

The starting position of the predetermined period (for example, the offset period) is not limited to the option 2-1 or 2-2. For example, the predetermined period may be a period starting from the transmission timing of the PUSCH scheduled by the DCI.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 7:
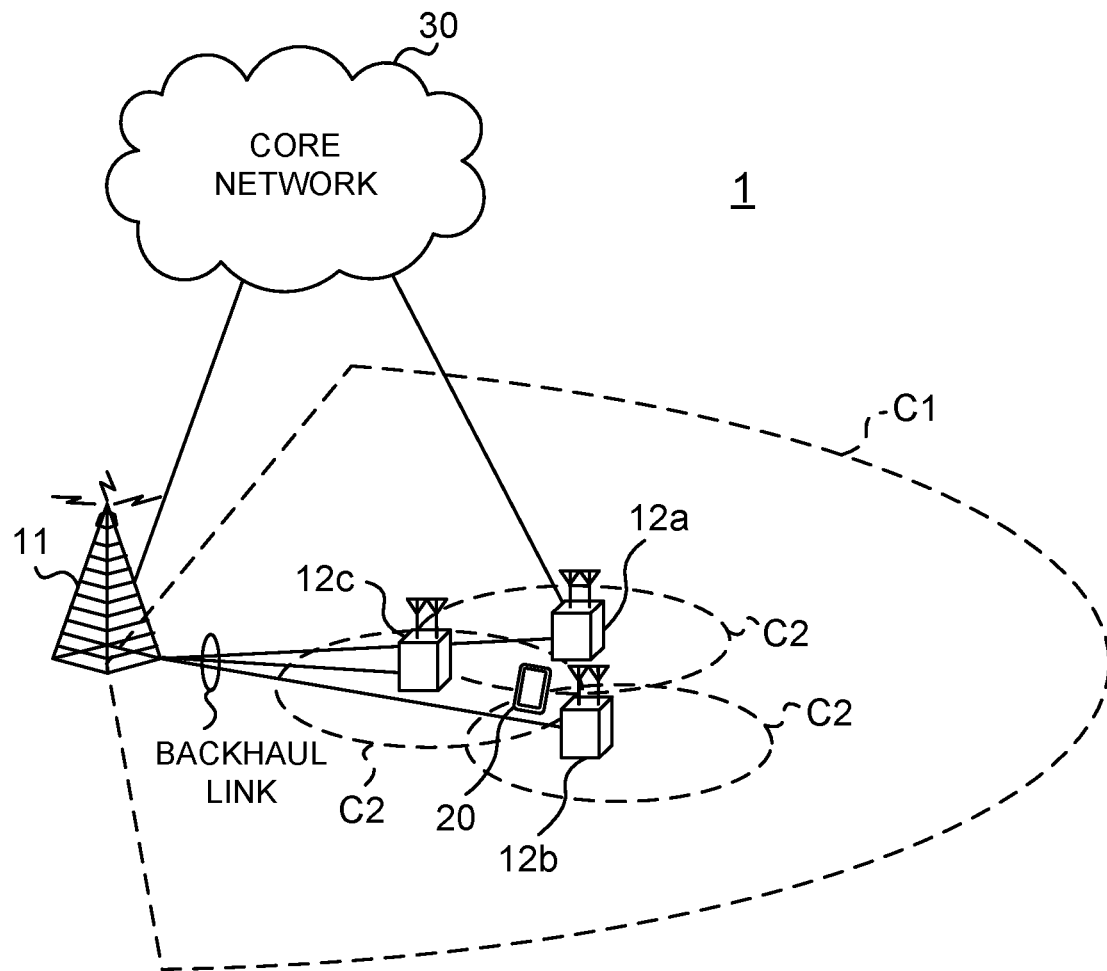
FIG. 7 is a diagram illustrating an example of a schematic configuration of a radio communication system according to one embodiment.

FIG. 7 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency band (frequency range 1 (FR1)) or a second frequency band (frequency range 2 (FR2)). The macro cell C1 may be included in the FR1, and the small cell C2 may be included in the FR2. For example, the FR1 may be a frequency range of 6 GHz or less (sub-6 GHz), and the FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

Further, the user terminal 20 may perform communication on each CC using at least one of time division duplex (TDD) or frequency division duplex (FDD).

The plurality of base stations 10 may be connected to each other in a wired manner (for example, an optical fiber, an X2 interface, or the like in compliance with common public radio interface (CPRI)) or in a radio manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may a terminal that corresponds to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. The user data, the higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

Note that the DCI that schedules the PDSCH may be referred to as DL assignment, DL DCI, or the like, and the DCI that schedules PUSCH may be referred to as UL grant, UL DCI, or the like. Note that the PDSCH may be replaced with DL data, and the PUSCH may be replaced with UL data.

For detection of the PDCCH, a control resource set (CORESET) and a search space may be used. The CORESET corresponds to a resource that searches for the DCI. The search space corresponds to a search area and a search method for PDCCH candidates. One CORESET may be associated with one or more search spaces. UE may monitor CORESET associated with a certain search space based on search space configuration.

One search space may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, the DMRSs may be referred to as "user terminal-specific reference signals (UE-specific reference signals)".

(Base Station)

Figure 8:
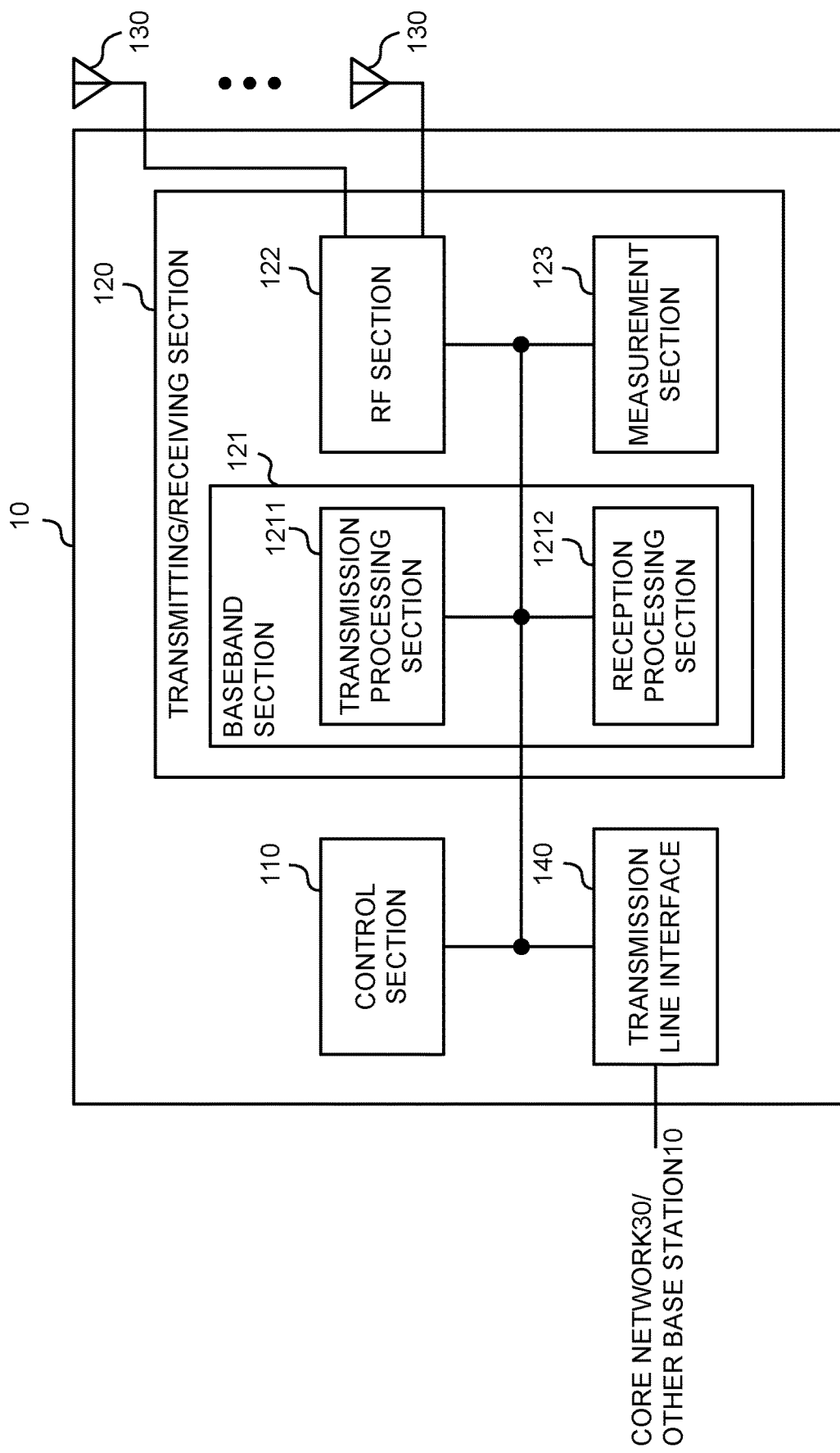
FIG. 8 is a diagram illustrating an example of a configuration of a base station according to one embodiment.

FIG. 8 is a diagram illustrating an example of a configuration of the base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may include the transmission processing section 1211 and the RF section 122. The receiving section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam or a reception beam using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

Note that, the transmitting section and the receiving section of the base station 10 in the present disclosure may include at least one of the transmitting/receiving section 120, the transmission/reception antenna 130, and the transmission line interface 140.

The transmitting/receiving section 120 may transmit information giving an instruction on the activation or deactivation of the panel.

The control section 110 may determine that the communication operation using the panel or the communication operation not using the panel is performed in the terminal after a certain offset period with reference to at least one of a reception timing of information giving an instruction on the activation or deactivation of the panel and a transmission timing of a delivery confirmation signal for the information.

(User Terminal)

Figure 9:
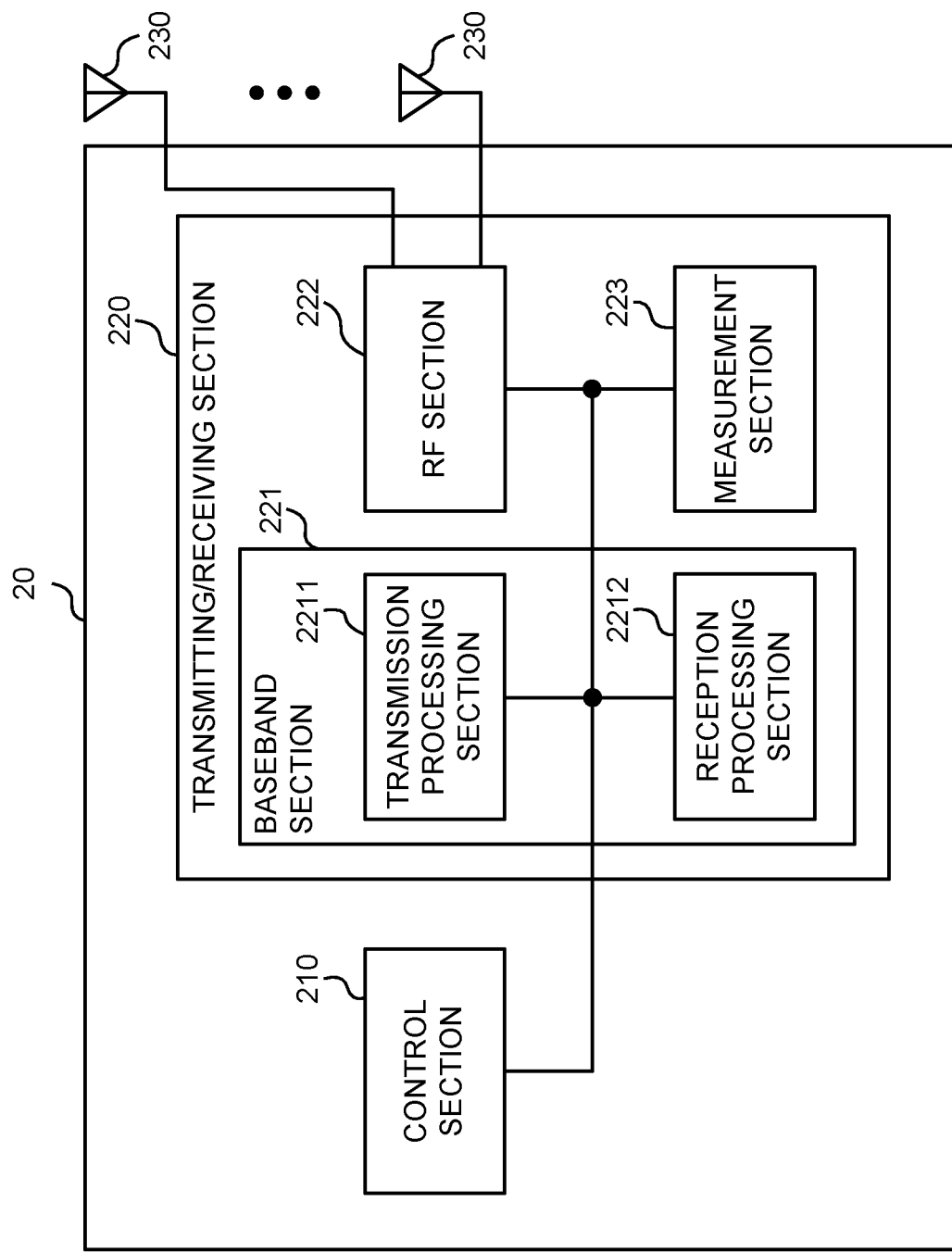
FIG. 9 is a diagram illustrating an example of a configuration of a user terminal according to one embodiment.

FIG. 9 is a diagram illustrating an example of a configuration of the user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may be configured by the reception processing section 2212, the RF section 222, and the measurement section 223.

The transmission/reception antenna 230 can include an antenna that is described on the basis of common recognition in the technical field related to the present disclosure, for example, an array antenna or the like.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a certain channel (for example, PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency band, filtering processing, amplification, and the like on the baseband signal, to transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

The transmitting/receiving section 220 may receive information (for example, at least one of RRC signaling, MAC CE, and DCI) regarding activation or deactivation of at least one of the plurality of panels. The control section 210 may use one of the plurality of panels for transmission or reception of the specific signal on the basis of the information.

The information may include at least one of an identifier corresponding to a panel, a serving cell identifier, and a bandwidth part (BWP) identifier.

The information may indicate the association between the panel and the specific signal.

The control section 210 may support the transmission or reception of the specific signal using the deactivated panel.

The transmitting/receiving section 220 may receive information giving an instruction on the activation or deactivation of the panel.

The control section 210 may perform control so as to perform the communication operation using the panel or the communication operation not using the panel after a certain offset period with reference to at least one of the reception timing of information (for example, the configuration information of the panel) giving an instruction on the activation or deactivation of the panel and the transmission timing of the delivery confirmation signal for the information.

The offset period may be determined in at least one unit of a subframe, a slot, a subslot, and a symbol on the basis of the subcarrier spacing of the downlink control channel used to receive the configuration information of the panel or the subcarrier spacing of the uplink control channel used to transmit the delivery confirmation signal.

The offset period in a case where an instruction on activation is given and the offset period in a case where an instruction on deactivation is given may be set separately.

The control section 210 may determine the offset period on the basis of whether or not the transmission configuration indication state of the downlink control channel used for receiving the configuration information of the panel is activated or whether or not the spatial relationship information of the uplink control channel used for transmitting the delivery confirmation signal is activated.

(Hardware Configuration)

Note that the block diagrams that have been used to describe the above embodiments illustrate blocks in functional units. These functional blocks (components) may be implemented in arbitrary combinations of at least one of hardware and software. Further, a method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using the plurality of apparatuses. The functional block may be implemented by combining the one apparatus or the plurality of apparatuses with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 10:
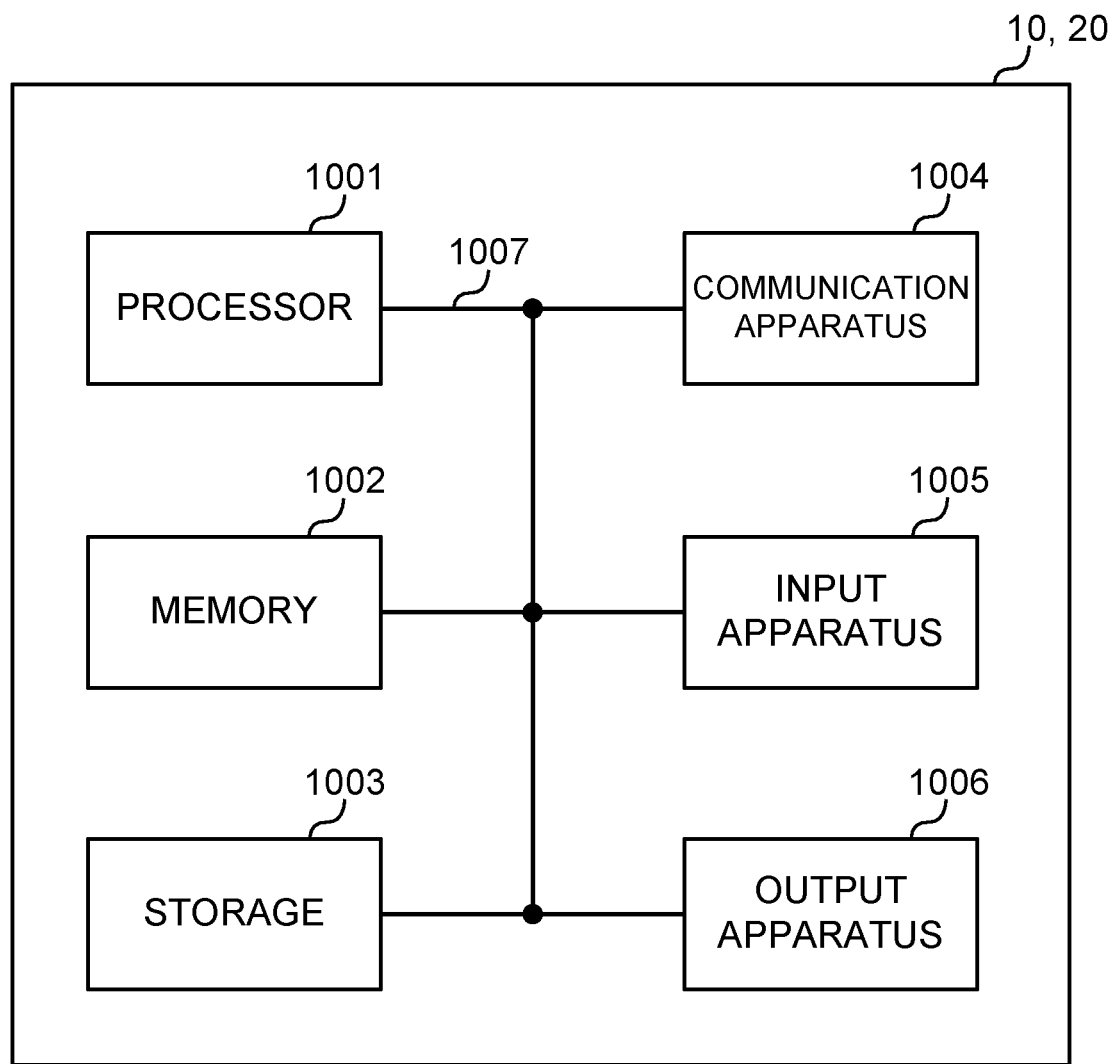
FIG. 10 is a diagram illustrating an example of a hardware configuration of the base station and the user terminal according to one embodiment.

For example, the base station, the user terminal, or the like according to one embodiment of the present disclosure may function as a computer that executes the processing of the radio communication method of the present disclosure. FIG. 10 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, and a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by, for example, reading given software (program) onto hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and the like from at least either the storage 1003 or the communication apparatus 1004 into the memory 1002, and executes various processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store a program (program code), a software module, and the like executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as a "secondary storage apparatus".

The communication apparatus 1004 is hardware (transmission/reception device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmitting section 120a (220a) and the receiving section 120b (220b) from each other.

The input apparatus 1005 is an input device for receiving input from the outside (for example, a keyboard, a mouse, a microphone, a switch, a button, a sensor, or the like). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, the apparatuses including the processor 1001, the memory 1002, or the like are connected by the bus 1007 so as to communicate information. The bus 1007 may be formed with a single bus, or may be formed with buses that vary between the apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

(Modifications)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in a time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, or the like.

The slot may include one or more symbols in the time domain (orthogonal frequency division multiplexing (OFDM) symbols, single carrier frequency division multiple access (SC-FDMA) symbols, and the like). Also, the slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as a "PDSCH (PUSCH) mapping type A". A PDSCH (or PUSCH) transmitted using the mini slot may be referred to as a "PDSCH (PUSCH) mapping type B".

A radio frame, a subframe, a slot, a mini slot, and a symbol all represent the time unit in signal transmission. The radio frame, the subframe, the slot, the mini slot, and the symbol may be called by other applicable names, respectively. Note that time units such as the frame, the subframe, the slot, the mini slot, and the symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and the TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot", or the like, instead of a "subframe".

Here, the TTI refers to a minimum time unit of scheduling in radio communication, for example. For example, in the LTE system, the base station performs scheduling to allocate radio resources (a frequency bandwidth, transmission power, and the like that can be used in each user terminal) to each user terminal in TTI units. Note that the definition of TTIs is not limited to this.

The TTI may be a transmission time unit such as a channel-coded data packet (transport block), a code block, a codeword, or the like, or may be a processing unit such as scheduling or link adaptation. Note that when TTI is given, a time interval (for example, the number of symbols) in which the transport blocks, the code blocks, the codewords, and the like are actually mapped may be shorter than TTI.

Note that, when one slot or one mini slot is referred to as a "TTI", one or more TTIs (that is, one or multiple slots or one or more mini slots) may be the minimum time unit of scheduling. Also, the number of slots (the number of mini slots) to constitute this minimum time unit of scheduling may be controlled.

A TTI having a time duration of 1 ms may be referred to as a normal TTI (TTI in 3GPP Rel. 8 to 12), a normal TTI, a long TTI, a usual subframe, a normal subframe, a long subframe, a slot, or the like. A TTI that is shorter than the normal TTI may be referred to as a shortened TTI, a short TTI, a partial TTI (or fractional TTI), a shortened subframe, a short subframe, a mini slot, a subslot, a slot, or the like.

Note that the long TTI (for example, a normal TTI, a subframe, or the like) may be replaced with a TTI having a time duration exceeding 1 ms, and the short TTI (for example, a shortened TTI) may be replaced with a TTI having a TTI duration less than the TTI duration of the long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on numerology.

Also, an RB may include one or more symbols in the time domain, and may be one slot, one mini slot, one subframe or one TTI in length. One TTI, one subframe, and the like may each include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB with reference to a common reference point of the carrier. A PRB may be defined in a certain BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE need not expect to transmit or receive a given signal/channel outside the active BWP. Note that, a "cell", a "carrier", and the like in the present disclosure may be replaced with a BWP.

Note that the structures of radio frames, subframes, slots, mini slots, symbols, or the like described above are merely examples. For example, configurations such as the number of subframes included in a radio frame, the number of slots per subframe or radio frame, the number of mini slots included in a slot, the number of symbols and the RBs included in a slot or a mini slot, the number of subcarriers included in the RB, the number of symbols in the TTI, the symbol length, the length of cyclic prefix (CP), and the like can be variously changed.

Furthermore, the information and parameters described in the present disclosure may be represented in absolute values, represented in relative values with respect to given values, or represented using other corresponding information. For example, an instruction on a radio resource may be given by a predetermined index.

Names used for, for example, parameters in the present disclosure are in no respect limitative. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, and the like described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals and the like may be input and output via a plurality of network nodes.

The information, signals and the like that are input and/or output may be stored in a specific location (for example, in a memory), or may be managed in a control table. The input and output information, signals, and the like can be overwritten, updated, or appended. The output information, signals, and the like may be deleted. The input information, signals and the like may be transmitted to other pieces of apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, reporting of predetermined information (for example, reporting of information to the effect that "X holds") does not necessarily have to be sent explicitly, and can be sent implicitly (for example, by not reporting this piece of information, by reporting another piece of information, and the like).

Decisions may be made in values represented by one bit (0 or 1), may be made in Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and the like.

Also, software, instructions, information, and the like may be transmitted and received via a transmission media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of the transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, terms such as a "mobile station (MS)", a "user terminal", a "user equipment (UE)", and "terminal" can be used interchangeably.

The mobile station may be referred to as a subscriber station, mobile unit, subscriber station, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and mobile station may be called as a transmission apparatus, a reception apparatus, a wireless communication apparatus, and the like. Note that at least one of the base station and the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station and the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel and a downlink channel may be replaced with a side channel.

Likewise, the user terminal in the present disclosure may be replaced with the base station. In this case, the base station 10 may be configured to have the functions of the user terminal 20 described above.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, although various methods have been illustrated in the present disclosure with various components of steps using exemplary orders, the specific orders that are illustrated herein are by no means limiting.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

Reference to elements with designations such as "first", "second", and the like as used in the present disclosure does not generally limit the number/quantity or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may encompass a wide variety of operations. For example, the "determining" may be regarded as judging, calculating, computing, processing, deriving, investigating, looking up, search, inquiry (for example, looking up in a table, database, or another data structure), ascertaining, and the like.

Furthermore, the "determining" used herein may be interpreted to mean making "determination" related to receiving (for example, receiving information), transmitting (for example, transmitting information), inputting, outputting, accessing (for example, accessing data in a memory), and the like.

In addition, the "determining" used herein may be interpreted to mean making "determination" related to resolving, selecting, choosing, establishing, comparing, and the like. In other words, the "determining" used herein may be interpreted to mean making "determination" related to some action.

In addition, "determining" used herein may be read as "assuming", "expecting", "considering", or the like.

The "maximum transmission power" described in the present disclosure may mean a maximum value of transmission power, nominal UE maximum transmit power, or rated UE maximum transmit power.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency domain, microwave, and optical (both visible and invisible) regions, or the like.

In the present disclosure, the phrase "A and B are different" may mean "A and B are different from each other". Note that the phrase may mean that "A and B are different from C". The terms such as "separated", "coupled", and the like may be similarly interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The invention claimed is:

1. A terminal comprising:
   a receiver configured to receive a Medium Access Control Control Element (MAC CE) giving an instruction on activation of a transmission configuration indicator (TCI) state; and
   a processor configured to perform control to perform a communication operation using the TCI state after an offset period starting from at least one of a reception timing of the MAC CE and a transmission timing of a delivery confirmation signal for the MAC CE,
   wherein the processor determines the offset period based on whether or not a TCI state for use in a communication operation after the offset period is activated.

2. The terminal according to claim 1, wherein the offset period is determined in at least one unit of a subframe, a slot, a subslot, and a symbol on the basis of a subcarrier spacing of an uplink control channel used to transmit the delivery confirmation signal.

3. A radio communication method of a terminal, comprising:
   receiving a Medium Access Control Control Element (MAC CE) giving an instruction on activation of a transmission configuration indicator (TCI) state; and
   performing control to perform a communication operation using the TCI state after an offset period starting from at least one of a reception timing of the MAC CE and a transmission timing of a delivery confirmation signal for the MAC CE, wherein the offset period is determined based on whether or not a TCI state for use in a communication operation after the offset period is activated.

4. A base station comprising:
a transmitter configured to transmit a Medium Access Control Control Element (MAC CE) giving an instruction on activation of a transmission configuration indicator (TCI) state; and
a processor configured to determine that a communication operation using the TCI state is performed in the terminal after an offset period starting from at least one of a reception timing of the MAC CE and a transmission timing of a delivery confirmation signal for the MAC CE,
wherein the processor determines the offset period based on whether or not a TCI state for use in a communication operation after the offset period is activated.

5. A system comprising a terminal and a base station, wherein:
the terminal comprises:
a receiver configured to receive a Medium Access Control Control Element (MAC CE) giving an instruction on activation of a transmission configuration indicator (TCI) state; and
a processor configured to perform control to perform a communication operation using the TCI state after an offset period starting from at least one of a reception timing of the MAC CE and a transmission timing of a delivery confirmation signal for the MAC CE,
wherein the processor determines the offset period based on whether or not a TCI state for use in a communication operation after the offset period is activated, and
the base station comprises:
a transmitter configured to transmit the MAC CE; and
a processor configured to determine that a communication operation using the TCI state is performed in the terminal after an offset period starting from at least one of a reception timing of the MAC CE and a transmission timing of a delivery confirmation signal for the MAC CE.

6. The terminal according to claim 1, wherein when the TCI state is not activated, the processor determines the offset period by adding a given value.

7. The terminal according to claim 6, wherein the given value is based on a value corresponding to a capability of the terminal.

* * * * *